(12) United States Patent
Gong (10) Patent No.: US 10,182,389 B2
(45) Date of Patent: Jan. 15, 2019

(54) METHOD AND APPARATUS FOR RESTRICTING USAGE REGION OF MOBILE TERMINAL, AND MOBILE TERMINAL

(71) Applicant: Huawei Technologies Co., Ltd., Shenzhen (CN)

(72) Inventor: Ashi Gong, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/551,131

(22) PCT Filed: Feb. 15, 2015

(86) PCT No.: PCT/CN2015/073113
§ 371 (c)(1),
(2) Date: Aug. 15, 2017

(87) PCT Pub. No.: WO2016/127432
PCT Pub. Date: Aug. 18, 2016

(65) Prior Publication Data
US 2018/0035355 A1 Feb. 1, 2018

(51) Int. Cl.
*H04W 48/04* (2009.01)
*H04W 64/00* (2009.01)
*H04W 48/16* (2009.01)

(52) U.S. Cl.
CPC .......... *H04W 48/04* (2013.01); *H04W 48/16* (2013.01); *H04W 64/00* (2013.01); *H04W 64/006* (2013.01)

(58) Field of Classification Search
CPC ..................................................... H04W 48/04
See application file for complete search history.

(56) References Cited

U.S. PATENT DOCUMENTS

| 5,966,668 A | 10/1999 | Lindroth |
| 2007/0275717 A1 | 11/2007 | Edge et al. |

(Continued)

FOREIGN PATENT DOCUMENTS

| CN | 101137173 A | 3/2008 |
| CN | 101137214 A | 3/2008 |

(Continued)

OTHER PUBLICATIONS

Foreign Communication From A Counterpart Application, European Application No. 15881594.4, Extended European Search Report dated Jan. 3, 2018, 10 pages.

(Continued)

*Primary Examiner* — Justin Y Lee
(74) *Attorney, Agent, or Firm* — Conley Rose, P.C.

(57) ABSTRACT

A method and an apparatus for restricting a usage region of a mobile terminal, and a mobile terminal are provided. Cell identification information of a cell network that covers a current location of a mobile terminal may be obtained. When the obtained cell identification information includes cell identification information matching locked identification information, the mobile terminal accesses a cell network corresponding to the locked identification information, otherwise, the mobile terminal skips accessing a wireless communications network. Hence, the cell identification information of the cell network at the current location is compared with the locked identification information to control cell network access of the mobile terminal.

13 Claims, 4 Drawing Sheets

(56) References Cited

U.S. PATENT DOCUMENTS

2014/0045505 A1  2/2014  Henry et al.
2015/0057003 A1  2/2015  Dwyer et al.

FOREIGN PATENT DOCUMENTS

| CN | 102984778 A | 3/2013 |
|---|---|---|
| GB | 2369004 A | 5/2002 |
| JP | H04373330 A | 12/1992 |
| JP | H07107550 B2 | 11/1995 |
| JP | 2012526407 A | 10/2012 |

OTHER PUBLICATIONS

Machine Translation and Abstract of Chinese Publication No. CN101137173, Mar. 5, 2008, 12 pages.
Machine Translation and Abstract of Chinese Publication No. CN101137214, Mar. 5, 2008, 10 pages.
Machine Translation and Abstract of Chinese Publication No. CN102984778, Mar. 20, 2013, 16 pages.
Foreign Communication From A Counterpart Application, PCT Application No. PCT/CN2015/073113, English Translation of International Search Report dated Nov. 19, 2015, 2 pages.
Foreign Communication From A Counterpart Application, PCT Application No. PCT/CN2015/073113, English Translation of Written Opinion dated Nov. 24, 2015, 7 pages.
Machine Translation and Abstract of Japanese Publication No. JPH04373330, Dec. 25, 1992, 8 pages.
Machine Translation and Abstract of Japanese Publication No. JPH07107550, Nov. 15, 1995, 11 pages.
Foreign Communication From a Counterpart Application, Japanese Application No. 2017-542441, Japanese Notice of Rejection dated Nov. 6, 2018, 3 pages.
Foreign Communication From a Counterpart Application, Japanese Application No. 2017-542441, English Translation of Japanese Notice of Rejection dated Nov. 6, 2018, 3 pages.

METHOD AND APPARATUS FOR RESTRICTING USAGE REGION OF MOBILE TERMINAL, AND MOBILE TERMINAL

CROSS-REFERENCE TO RELATED APPLICATIONS

This application is a U.S. National Stage of International Patent Application No. PCT/CN2015/073113 filed on Feb. 15, 2015, which is hereby incorporated by reference in its entirety.

TECHNICAL FIELD

The present disclosure relates to the field of mobile communications, and in particular, to a method and an apparatus for restricting a usage region of a mobile terminal, and a mobile terminal.

BACKGROUND

For a particular purpose, usage ranges of some mobile terminals (for example, mobile phones, point of sale (POS) machines, and a portable wireless broadband apparatus (MIFI)) often need to be restricted. Within only a specified usage range, these mobile terminals can normally use a wireless communication service such as a voice communication service, a short message service, or a data communication service provided by a communications operator. For example, MIFI can be used only in a specified region. When MIFI is in the specified region, MIFI can work normally to provide a wireless network for another device. When MIFI is outside the specified region, MIFI cannot work normally and cannot provide a wireless network for another device.

In other approaches, a usage range of a mobile terminal is restricted by locking a location area code. When a mobile terminal is in a region identified by a locked location area code, the mobile terminal can normally use a wireless communication service. Otherwise, the mobile terminal cannot normally use a wireless communication service.

However, a region identified by a location area code is excessively large, and even a district or a county is in a region identified by a location area code. Therefore, in the other approaches, a usage range of a mobile terminal cannot be restricted precisely.

SUMMARY

Embodiments of the present disclosure provide a method and an apparatus for restricting a usage region of a mobile terminal, and a mobile terminal to restrict a usage range of a mobile terminal more precisely. Solutions are as follows.

According to a first aspect, a method for restricting a usage region of a mobile terminal is provided. The method is applied to a mobile terminal, and the method includes obtaining cell identification information of at least one cell network that covers a current location of the mobile terminal, where the cell network corresponds to a wireless communications network corresponding to a network standard supported by the mobile terminal, and the cell identification information is frequency channel number information, or the cell identification information includes frequency channel number information and auxiliary cell identification information, determining whether the cell identification information includes cell identification information matching locked identification information, where a parameter of the locked identification information is in a one-to-one correspondence with a parameter of the cell identification information, and accessing, by the mobile terminal, a cell network corresponding to the locked identification information, when the obtained cell identification information includes the cell identification information matching the locked identification information, or skipping accessing, by the mobile terminal, a wireless communication network when the obtained cell identification information does not include the cell identification information matching the locked identification information.

With reference to the first aspect, in a first possible implementation manner, when the network standard supported by the mobile terminal is Global System for Mobile Communications (GSM), the cell identification information is frequency channel number information and the locked identification information includes a locked frequency channel number, and when the network standard supported by the mobile terminal is not GSM, the cell identification information includes frequency channel number information and auxiliary cell identification information, and the locked identification information includes a locked frequency channel number and locked auxiliary identification information.

With reference to the first aspect, in a second possible implementation manner, before determining whether the cell identification information includes cell identification information matching locked identification information, the method further includes determining a cell network having maximum signal strength in the at least one cell network that covers the current location of the mobile terminal, and sending cell identification information corresponding to the cell network having maximum signal strength to a control device connected to the mobile device, determining, according to a region lock instruction delivered by the control device, the cell identification information corresponding to the cell network having maximum signal strength, where the region lock instruction includes the cell identification information corresponding to the cell network having maximum signal strength, and determining the cell identification information corresponding to the cell network having maximum signal strength as the locked identification information.

With reference to the first aspect, in a third possible implementation manner, accessing, by the mobile terminal, a cell network corresponding to the locked identification information, when the obtained cell identification information includes the cell identification information matching the locked identification information includes accessing, by the mobile terminal, the cell network corresponding to the locked identification information when the obtained cell identification information includes the cell identification information matching the locked identification information, and signal strength of the cell identification information matching the locked identification information is not less than a preset strength threshold.

With reference to the first to the third possible implementation manners of the first aspect, in a fourth possible implementation manner, obtaining cell identification information of at least one cell network that covers a current location of the mobile terminal includes performing, by the mobile terminal, frequency scanning, and obtaining the cell identification information of the at least one cell network that covers the current location of the mobile terminal from a frequency scanning result, or receiving, by the mobile terminal, a cell broadcast message, and obtaining, from the broadcast message, the cell identification information of the at least one cell network that covers the current location of the mobile terminal.

According to a second aspect, an apparatus for restricting a usage region of a mobile terminal is provided. The apparatus is applied to a mobile terminal, and the apparatus includes a cell identification information obtaining unit, a match determining unit, a network access unit, and a network discarding unit, where the cell identification information obtaining unit is configured to obtain cell identification information of at least one cell network that covers a current location of the mobile terminal, where the cell network corresponds to a wireless communications network corresponding to a network standard supported by the mobile terminal, and the cell identification information is frequency channel number information, or the cell identification information includes frequency channel number information and auxiliary cell identification information. The match determining unit is configured to determine whether the cell identification information includes cell identification information matching locked identification information, where a parameter of the locked identification information is in a one-to-one correspondence with a parameter of the cell identification information. The network access unit is configured to access a cell network corresponding to the locked identification information, when the cell identification information obtained by the cell identification information obtaining unit includes the cell identification information matching the locked identification information, and the network discarding unit is configured to skip accessing a wireless communication network when the cell identification information obtained by the cell identification information obtaining unit does not include the cell identification information matching the locked identification information.

With reference to the second aspect, in a first possible implementation manner, when the network standard supported by the mobile terminal is GSM, the cell identification information is frequency channel number information and the locked identification information includes a locked frequency channel number, and when the network standard supported by the mobile terminal is not GSM, the cell identification information includes frequency channel number information and auxiliary cell identification information, and the locked identification information includes a locked frequency channel number and locked auxiliary identification information.

With reference to the second aspect, in a second possible implementation manner, the apparatus further includes a strongest network determining unit, an identification information determining unit, and an identification information locking unit, where before determining, by the match determining unit, whether the cell identification information includes the cell identification information matching the locked identification information, the strongest network determining unit is configured to determine a cell network having maximum signal strength in the at least one cell network that covers the current location of the mobile terminal, and send cell identification information corresponding to the cell network having maximum signal strength to a control device connected to the mobile device. The identification information determining unit is configured to determine, according to a region lock instruction delivered by the control device, the cell identification information corresponding to the cell network having maximum signal strength, where the region lock instruction includes the cell identification information corresponding to the cell network having maximum signal strength, and the identification information locking unit is configured to determine the cell identification information corresponding to the cell network having maximum signal strength as the locked identification information.

With reference to the second aspect, in a third possible implementation manner, the network access unit is further configured to access, by the mobile terminal, the cell network corresponding to the locked identification information when the obtained cell identification information includes the cell identification information matching the locked identification information, and signal strength of the cell identification information matching the locked identification information is not less than a preset strength threshold.

With reference to the first to the third possible implementation manners of the second aspect, in a fourth possible implementation manner, the cell identification information obtaining unit includes a frequency scanning subunit and/or a broadcast receiving subunit, where the frequency scanning subunit is configured to perform frequency scanning, and obtain the cell identification information of the at least one cell network that covers the current location of the mobile terminal from a frequency scanning result, and the broadcast receiving subunit is configured to receive a cell broadcast message, and obtain, from the broadcast message, the cell identification information of the at least one cell network that covers the current location of the mobile terminal.

According to a third aspect, a storage medium is provided. The storage medium is configured to store an application program. When the application program runs, the method for restricting a usage region of a mobile terminal in the embodiments of the present disclosure is executed. The method for restricting a usage region of a mobile terminal in the embodiments of the present disclosure is applied to a mobile terminal, and the method may include obtaining cell identification information of at least one cell network that covers a current location of the mobile terminal, where the cell network corresponds to a wireless communications network corresponding to a network standard supported by the mobile terminal, and the cell identification information is frequency channel number information, or the cell identification information includes frequency channel number information and auxiliary cell identification information, determining whether the cell identification information includes cell identification information matching locked identification information, where a parameter of the locked identification information is in a one-to-one correspondence with a parameter of the cell identification information, and accessing, by the mobile terminal, a cell network corresponding to the locked identification information, when the obtained cell identification information includes the cell identification information matching the locked identification information, or skip accessing, by the mobile terminal, a wireless communication network when the obtained cell identification information does not include the cell identification information matching the locked identification information.

According to a fourth aspect, an application program is provided. When the application program runs, the method for restricting a usage region of a mobile terminal in the embodiments of the present disclosure is executed. The method for restricting a usage region of a mobile terminal in the embodiments of the present disclosure is applied to a mobile terminal, and the method may include obtaining cell identification information of at least one cell network that covers a current location of the mobile terminal, where the cell network corresponds to a wireless communications network corresponding to a network standard supported by the mobile terminal, and the cell identification information is frequency channel number information, or the cell identification information includes frequency channel number information and auxiliary cell identification information, determining whether the cell identification information includes cell identification information matching locked identification information, where a parameter of the locked identification information is in a one-to-one correspondence with a parameter of the cell identification information, and accessing, by the mobile terminal, a cell network corresponding to the locked identification information, when the obtained cell identification information includes the cell identification information matching the locked identification information, or skip accessing, by the mobile terminal, a wireless communication network when the obtained cell identification information does not include the cell identification information matching the locked identification information.

According to a fifth aspect, a mobile terminal is provided, including a processor, a memory, a communications interface, and a bus, where the processor, the memory, and the communications interface are connected and communicate with each other using the bus. The memory stores executable program code. The processor reads the executable program code stored in the memory to run a program corresponding to the executable program code to perform the following steps of obtaining cell identification information of at least one cell network that covers a current location of the mobile terminal, where the cell network corresponds to a wireless communications network corresponding to a network standard supported by the mobile terminal, and the cell identification information is frequency channel number information, or the cell identification information includes frequency channel number information and auxiliary cell identification information, determining whether the cell identification information includes cell identification information matching locked identification information, where a parameter of the locked identification information is in a one-to-one correspondence with a parameter of the cell identification information, and accessing a cell network corresponding to the locked identification information, when the obtained cell identification information includes the cell identification information matching the locked identification information, or skip accessing a wireless communication network when the obtained cell identification information does not include the cell identification information matching the locked identification information.

As can be known from the foregoing technical solutions, according to the method and the apparatus for restricting a usage region of a mobile terminal, and the mobile terminal in the embodiments of the present disclosure, cell identification information of a cell network that covers a current location of a mobile terminal may be obtained. When the obtained cell identification information includes cell identification information matching locked identification information, the mobile terminal accesses a cell network corresponding to the locked identification information. Otherwise, the mobile terminal skips accessing a wireless communications network. In the present disclosure, the cell identification information of the cell network at the current location is compared with the locked identification information, to control cell network access of the mobile terminal. In the present disclosure, because a region corresponding to a cell is smaller than that corresponding to a location area code, a usage range of the mobile terminal can be more precisely restricted.

BRIEF DESCRIPTION OF DRAWINGS

To describe the technical solutions in the embodiments of the present disclosure more clearly, the following briefly describes the accompanying drawings required in the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and embodiments. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
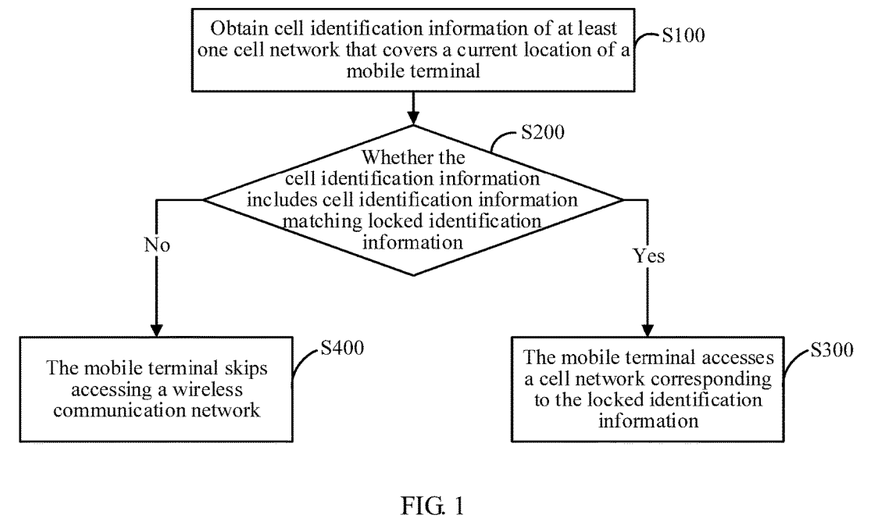
FIG. 1 is a flowchart of a method for restricting a usage region of a mobile terminal according to an embodiment of the present disclosure.

As shown in FIG. 1, an embodiment of the present disclosure provides a method for restricting a usage region of a mobile terminal. The method is applied to a mobile terminal, and the method may include the following steps.

Step S100: Obtain cell identification information of at least one cell network that covers a current location of the mobile terminal, where the cell network corresponds to a wireless communications network corresponding to a network standard supported by the mobile terminal, and the cell identification information is frequency channel number information, or the cell identification information includes frequency channel number information and auxiliary cell identification information.

The mobile terminal may be a mobile phone, a POS machine, an MIFI, or the like.

A cell (also referred to as a cellular cell) is a minimum unit on a wireless communications network, and multiple cells may form a region corresponding to a location area code. A cell is smaller than a region corresponding to a location area code.

The frequency channel number information is a number of a fixed frequency. To avoid interference caused by same frequency channel number information, frequency channel number information of cells in a region is different from each other. Frequency channel number information of cells is different from each other in a wide area of a communications apparatus that uses a standard of GSM. Therefore, frequency channel number information, obtained by the mobile terminal, of cells of the wireless communications network that covers the current location is different from each other.

A frequency multiplexing technology is used in a network standard such as Wideband Code Division Multiple Access (WCDMA), Time Division Synchronous Code Division Multiple Access (TD-SCDMA), or Long Term Evolution (LTE). Therefore, frequency channel number information, obtained by the mobile terminal, of the cell network that covers the current location may be the same. Therefore, to reduce misoperations, auxiliary cell identification information of a cell may also be obtained to identify the cell. In WCDMA, auxiliary cell identification information is a primary scrambling code. In TD-SCDMA, auxiliary cell identification information is a scrambling code. In LTE, auxiliary cell identification information is a physical layer cell number. Cells can be more precisely distinguished using frequency channel number information of the cells and auxiliary cell identification information of the cells, to reduce misoperations. The cell identification information may consist of the frequency channel number information and the auxiliary cell identification information.

It may be understood that, different frequency bands are used in different network standards. For example, frequency channel numbers of a frequency band 900 megahertz (MHz) and a frequency band 1800 MHz are used in the GSM standard. When the mobile terminal supports only the GSM standard, frequency channel number information of the frequency band 900 MHz and the frequency band 1800 MHz may be obtained.

Further, alternatively, only cell identification information of at least one cell network of a first communications operator that covers the current location of the mobile terminal may be obtained. The first communications operator is a communications operator that provides a subscriber identity module card/universal subscriber identity module card of the mobile terminal.

For example, for the frequency band 900 MHz in the GSM standard, a downlink frequency band of CHINA MOBILE is 935-954 MHz, and a downlink frequency band of CHINA UNICOM is 954-960 MHz. When the subscriber identity module card/universal subscriber identity module card of the mobile terminal is provided by CHINA MOBILE, only frequency channel number information of 935-954 MHz may be obtained.

Figure 2:
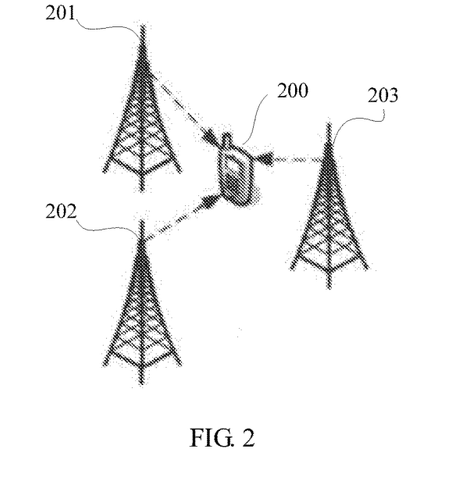
FIG. 2 is a schematic diagram of coverage of a wireless communications network according to an embodiment of the present disclosure.

A wireless communication signal of a cell network is provided by a base station, and one base station may provide a wireless communication signal for one or more cell networks. When multiple cell networks cover the current location of the mobile terminal, the mobile terminal may obtain wireless communication signals of the multiple cell networks provided by a base station. As shown in FIG. 2, it is assumed that a base station 201 provides a wireless communication signal for a cell network A, a base station 202 provides a wireless communication signal for a cell network B, and a base station 203 provides a wireless communication signal for a cell network C, and the wireless communication signals of the three cell networks A, B, and C cover a current location of the mobile terminal 200. In this case, the mobile terminal 200 may obtain cell identification information of the three cell networks A, B, and C at the current location.

The mobile terminal 200 may obtain the cell identification information by performing frequency scanning or receiving a cell broadcast message. Further, step S100 may include performing, by the mobile terminal, frequency scanning, and obtaining the cell identification information of the at least one cell network that covers the current location of the mobile terminal from a frequency scanning result, or receiving, by the mobile terminal, a cell broadcast message, and obtaining, from the broadcast message, the cell identification information of the at least one cell network that covers the current location of the mobile terminal.

Step S200: Determine whether the cell identification information includes cell identification information matching locked identification information, where a parameter of the locked identification information is in a one-to-one correspondence with a parameter of the cell identification information.

When the network standard supported by the mobile terminal is GSM, the cell identification information is frequency channel number information and the locked identification information includes a locked frequency channel number, and when the network standard supported by the mobile terminal is not GSM, the cell identification information includes frequency channel number information and auxiliary cell identification information, and the locked identification information includes a locked frequency channel number and locked auxiliary identification information.

Step S300: The mobile terminal accesses a cell network corresponding to the locked identification information, when the obtained cell identification information includes the cell identification information matching the locked identification information.

Step S400: The mobile terminal skips accessing a wireless communication network when the obtained cell identification information does not include the cell identification information matching the locked identification information.

Further, a network access function of the mobile terminal may be locked in a particular period to not access a wireless communications network in order to discard the network. For example, cell handover and cell reselection functions of the mobile terminal are locked. After a period during which the network access function of the mobile terminal is locked is beyond the particular period, go back to step S100.

The locked identification information may be cell identification information of a cell covered in a restricted region. The restricted region is a usage region, such as a factory, to which the mobile terminal needs to be restricted. There may be one or at least two pieces of locked identification information.

Optionally, when the obtained cell identification information includes only the cell identification information matching the locked identification information, the cell network corresponding to the locked identification information may be accessed. When the obtained cell identification information includes at least two pieces of cell identification information matching the locked identification information, a cell network corresponding to one piece of the locked identification information may be accessed. Preferably, a cell network that corresponds to the locked identification information and has maximum signal strength may be accessed.

Optionally, step S300 may include accessing, by the mobile terminal, the cell network corresponding to the locked identification information when the obtained cell identification information includes the cell identification information matching the locked identification information, and signal strength of the cell identification information matching the locked identification information is not less than a preset strength threshold.

In some cases, although the mobile terminal can access the cell network corresponding to the locked identification information, the cell network has relatively poor signal strength and cannot provide a desirable communication service for a user. Therefore, to ensure that a desirable communication service is provided for a user, the cell network corresponding to the locked identification information may be accessed when signal strength is relatively high.

According to the method for restricting a usage region of a mobile terminal provided in this embodiment of the present disclosure, cell identification information of a cell network that covers a current location of a mobile terminal may be obtained. When the obtained cell identification information includes cell identification information matching locked identification information, the mobile terminal accesses a cell network corresponding to the locked identification information. Otherwise, the mobile terminal skips accessing a wireless communications network. In the present disclosure, the cell identification information of the cell network at the current location is compared with the locked identification information to control cell network access of the mobile terminal. In the present disclosure, because a region corresponding to a cell is smaller than that corresponding to a location area code, a usage range of the mobile terminal can be more precisely restricted.

Figure 3:
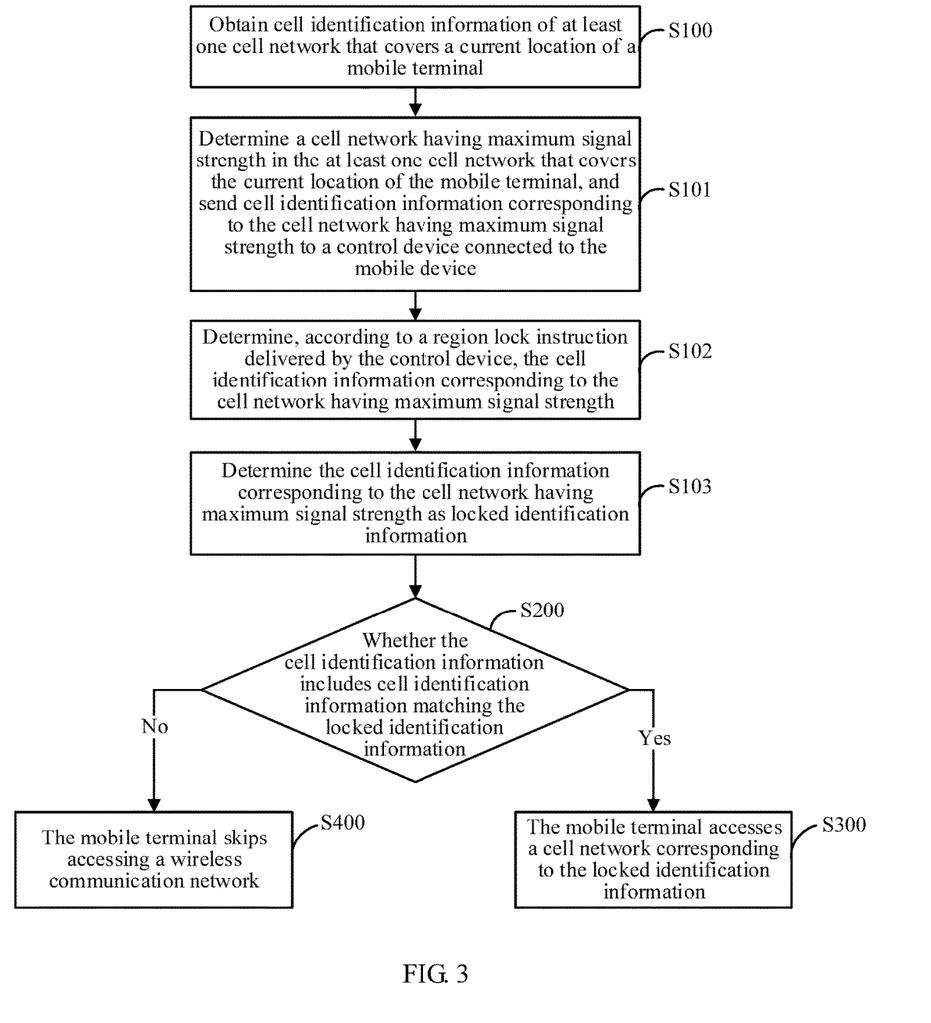
FIG. 3 is a flowchart of another method for restricting a usage region of a mobile terminal according to an embodiment of the present disclosure.

Based on the embodiment shown in FIG. 1, as shown in FIG. 3, an embodiment of the present disclosure provides another method for restricting a usage region of a mobile terminal. Before step S200, the method may further include the following steps.

Step S101: Determine a cell network having maximum signal strength in the at least one cell network that covers the current location of the mobile terminal, and send cell identification information corresponding to the cell network having maximum signal strength to a control device connected to the mobile device.

In another embodiment of the present disclosure, alternatively, cell identification information corresponding to another cell network that covers the current location of the mobile terminal may also be sent to a control device. When multiple pieces of cell identification information are sent to the control device, signal strength information may be simultaneously sent to the control device.

Step S102: Determine, according to a region lock instruction delivered by the control device, the cell identification information corresponding to the cell network having maximum signal strength, where the region lock instruction includes the cell identification information corresponding to the cell network having maximum signal strength.

The region lock instruction may be delivered by the control device after a user performs a region locking operation on the control device, or may be automatically delivered by the control device.

Step S103: Determine the cell identification information corresponding to the cell network having maximum signal strength as the locked identification information.

It may be understood that, when the mobile terminal is located in the restricted region, steps S101 to S103 may be performed. The cell network having maximum signal strength is one of cell networks that provide wireless communication services for the mobile terminal at the current location of the restricted region. The cell network has maximum signal strength and therefore provides highest wireless communication service quality. When the cell identification information corresponding to the cell network having maximum signal strength is set as the locked identification information, the mobile terminal can access the cell network having better service quality.

Steps S101 to S103 are a process of setting the locked identification information. It may be understood that, the setting process does not need to be performed each time before step S200 is performed. Alternatively, steps S101 to S103 may be performed before step S100, and a sequence of performing steps S101 to S103 and step S100 is not limited in the present disclosure.

The control device may be a server, a personal computer, a mobile device, or the like that is in communication connection with the mobile terminal. In the present disclosure, the mobile terminal may be in communication connection with the control device using WI-FI, a universal serial bus (USB) path, or the like. After step S103 is performed, step S200 shown in FIG. 1 may start to be performed. After performing step S300 or step S400, the mobile terminal may further return a cell network access result, for example, whether a cell network is accessed, or information about an accessed cell network, to the control device.

Figure 4:
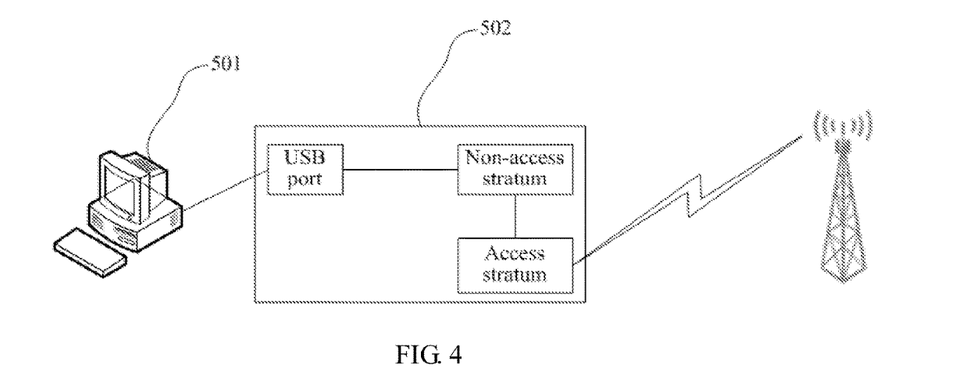
FIG. 4 is a schematic diagram of communication between a control device and a mobile terminal according to an embodiment of the present disclosure.

When the control device is in communication connection with the mobile terminal using a USB path, referring to FIG. 4, a process in which a mobile terminal 502 communicates with a control device 501 to set locked identification information and attempt to access a cell may include the following.

Step 1: Delivering, by the control device 501 using a USB path, a first control instruction for obtaining cell identification information to the mobile terminal 502;

Step 2: After the mobile terminal 502 receives the first control instruction using a USB port, forwarding, by the USB port, the first control instruction to a non-access stratum;

Step 3: Parsing, by the non-access stratum, the first control instruction, and sending a message obtained after parsing to an access stratum;

Step 4: Performing, by the access stratum, frequency scanning, or receiving a broadcast message, obtaining cell identification information of at least one cell network that covers a current location of the mobile terminal 502, determining a cell network having maximum signal strength in the at least one cell network that covers the current location of the mobile terminal 502, and sending cell identification information corresponding to the cell network having maximum signal strength to the non-access stratum;

Step 5: Sending, by the non-access stratum to the control device 501 using the USB path, the cell identification information sent by the access stratum;

Step 6: Sending, by the control device 501, a region lock instruction to the mobile terminal 502 using the USB path, where the region lock instruction includes the cell identification information corresponding to the cell network having maximum signal strength;

Step 7: Forwarding, by the USB port of the mobile terminal 502, the region lock instruction to the non-access stratum;

Step 8: Parsing, by the non-access stratum, the region lock instruction, and sending a message obtained after parsing to the access stratum, where the message obtained after parsing includes the cell identification information corresponding to the cell network having maximum signal strength;

Step 9: Setting, by the access stratum, the cell identification information corresponding to the cell network having maximum signal strength as locked identification information, searching the cell identification information obtained in step 4 for cell identification information matching the locked identification information, and if the cell identification information matching the locked identification information is found, accessing a cell network corresponding to the locked identification information, otherwise, skip accessing a wireless communications network and performing network discarding processing; and Step 10: Returning, by the mobile terminal 502, a processing result of step 9 to the control device 501 using the USB path.

The access stratum and the non-access stratum are the other approaches of mobile terminal communications technologies, and a person skilled in the art can understand the foregoing working process of the access stratum and the non-access stratum.

The present disclosure further provides an apparatus for restricting a usage region of a mobile terminal in correspondence with the foregoing method embodiment.

Figure 5:
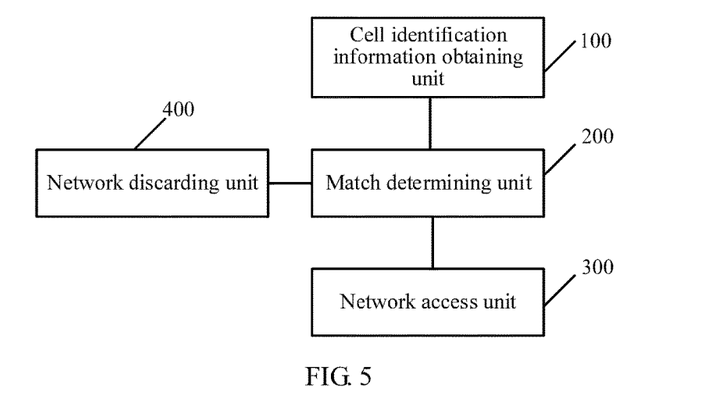
FIG. 5 is a schematic structural diagram of an apparatus for restricting a usage region of a mobile terminal according to an embodiment of the present disclosure.

As shown in FIG. 5, an embodiment of the present disclosure provides an apparatus for restricting a usage region of a mobile terminal. The apparatus is applied to a mobile terminal, and the apparatus may include a cell identification information obtaining unit 100, a match determining unit 200, a network access unit 300, and a network discarding unit 400.

The cell identification information obtaining unit 100 is configured to obtain cell identification information of at least one cell network that covers a current location of the mobile terminal, where the cell network corresponds to a wireless communications network corresponding to a network standard supported by the mobile terminal, and the cell identification information is frequency channel number information, or the cell identification information includes frequency channel number information and auxiliary cell identification information.

The mobile terminal may be a mobile phone, a POS machine, an MIFI, or the like.

The cell identification information obtaining unit 100 may include a frequency scanning subunit (not shown) and/or a broadcast receiving subunit (not shown).

The frequency scanning subunit is configured to perform frequency scanning, and obtain the cell identification information of the at least one cell network that covers the current location of the mobile terminal from a frequency scanning result.

The broadcast receiving subunit is configured to receive a cell broadcast message, and obtain, from the broadcast message, the cell identification information of the at least one cell network that covers the current location of the mobile terminal.

The match determining unit 200 is configured to determine whether the cell identification information includes cell identification information matching locked identification information, where a parameter of the locked identification information is in a one-to-one correspondence with a parameter of the cell identification information.

When the network standard supported by the mobile terminal is GSM, the cell identification information is frequency channel number information and the locked identification information includes a locked frequency channel number, and when the network standard supported by the mobile terminal is not GSM, the cell identification information includes frequency channel number information and auxiliary cell identification information, and the locked identification information includes a locked frequency channel number and locked auxiliary identification information.

The network access unit 300 is configured to access a cell network corresponding to the locked identification information, when the cell identification information obtained by the cell identification information obtaining unit 100 includes the cell identification information matching the locked identification information.

The network discarding unit 400 is configured to skip accessing a wireless communication network when the cell identification information obtained by the cell identification information obtaining unit 100 does not include the cell identification information matching the locked identification information.

Further, a network access function of the mobile terminal may be locked in a particular period to not access a wireless communications network in order to discard the network. For example, cell handover and cell reselection functions of the mobile terminal are locked. After a period during which the network access function of the mobile terminal is locked is beyond the particular period, the cell identification information obtaining unit 100 may be triggered again.

The network access unit 300 may be configured to access, by the mobile terminal, the cell network corresponding to the locked identification information when the obtained cell identification information includes the cell identification information matching the locked identification information, and signal strength of the cell identification information matching the locked identification information is not less than a preset strength threshold.

In some cases, although the mobile terminal can access the cell network corresponding to the locked identification information, the cell network has relatively poor signal strength and cannot provide a desirable communication service for a user. Therefore, to ensure that a desirable communication service is provided for a user, the cell network corresponding to the locked identification information may be accessed when signal strength is relatively high.

According to the apparatus for restricting a usage region of a mobile terminal provided in this embodiment of the present disclosure, cell identification information of a cell network that covers a current location of a mobile terminal may be obtained. When the obtained cell identification information includes cell identification information matching locked identification information, the mobile terminal accesses a cell network corresponding to the locked identification information. Otherwise, the mobile terminal skips accessing a wireless communications network. In the present disclosure, the cell identification information of the cell network at the current location is compared with the locked identification information to control cell network access of the mobile terminal. In the present disclosure, because a region corresponding to a cell is smaller than that corresponding to a location area code, a usage range of the mobile terminal can be more precisely restricted.

Figure 6:
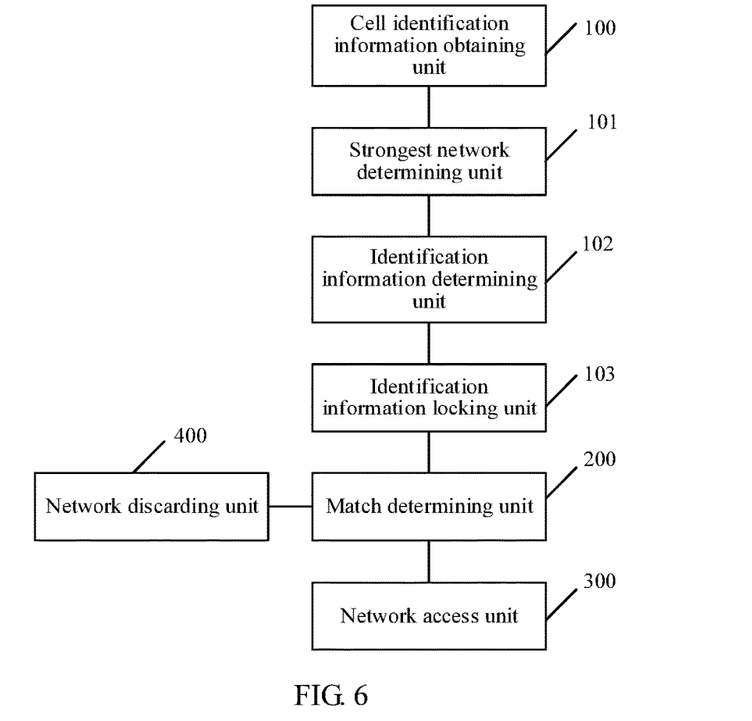
FIG. 6 is a schematic structural diagram of another apparatus for restricting a usage region of a mobile terminal according to an embodiment of the present disclosure.

Based on the embodiment shown in FIG. 5, as shown in FIG. 6, an embodiment of the present disclosure provides another apparatus for restricting a usage region of a mobile terminal. The apparatus may further include a strongest network determining unit 101, an identification information determining unit 102, and an identification information locking unit 103.

The strongest network determining unit 101 is configured to determine a cell network having maximum signal strength in the at least one cell network that covers the current location of the mobile terminal, and send cell identification information corresponding to the cell network having maximum signal strength to a control device connected to the mobile device before determining, by the match determining unit 200, whether the cell identification information includes the cell identification information matching the locked identification information.

The identification information determining unit 102 is configured to determine, according to a region lock instruction delivered by the control device, the cell identification information corresponding to the cell network having maximum signal strength, where the region lock instruction includes the cell identification information corresponding to the cell network having maximum signal strength.

The region lock instruction may be delivered by the control device after a user performs a region locking operation on the control device, or may be automatically delivered by the control device.

The identification information locking unit 103 is configured to determine the cell identification information corresponding to the cell network having maximum signal strength as the locked identification information.

The cell network having maximum signal strength is one of cell networks that provide wireless communication services for the mobile terminal at the current location of the restricted region. The cell network has maximum signal strength and therefore provides highest wireless communication service quality. When the cell identification information corresponding to the cell network having maximum signal strength is set as the locked identification information, the mobile terminal can access the cell network having better service quality.

The control device may be a server, a personal computer, a mobile device, or the like that is in communication connection with the mobile terminal. In the present disclosure, the mobile terminal may be in communication connection with the control device using WI-FI, a USB path, or the like.

Correspondingly, an embodiment of the present disclosure further provides a storage medium. The storage medium is configured to store an application program. When the application program runs, the method for restricting a usage region of a mobile terminal in the embodiments of the present disclosure is executed. The method for restricting a usage region of a mobile terminal in the embodiments of the present disclosure is applied to a mobile terminal, and the method may include obtaining cell identification information of at least one cell network that covers a current location of the mobile terminal, where the cell network corresponds to a wireless communications network corresponding to a network standard supported by the mobile terminal, and the cell identification information is frequency channel number information, or the cell identification information includes frequency channel number information and auxiliary cell identification information, determining whether the cell identification information includes cell identification information matching locked identification information, where a parameter of the locked identification information is in a one-to-one correspondence with a parameter of the cell identification information, and accessing, by the mobile terminal, a cell network corresponding to the locked identification information, when the obtained cell identification information includes the cell identification information matching the locked identification information, or skip accessing, by the mobile terminal, a wireless communication network when the obtained cell identification information does not include the cell identification information matching the locked identification information.

An embodiment of the present disclosure further provides an application program. When the application program runs, the method for restricting a usage region of a mobile terminal in the embodiments of the present disclosure is executed. The method for restricting a usage region of a mobile terminal in the embodiments of the present disclosure is applied to a mobile terminal, and the method may include obtaining cell identification information of at least one cell network that covers a current location of the mobile terminal, where the cell network corresponds to a wireless communications network corresponding to a network standard supported by the mobile terminal, and the cell identification information is frequency channel number information, or the cell identification information includes frequency channel number information and auxiliary cell identification information, determining whether the cell identification information includes cell identification information matching locked identification information, where a parameter of the locked identification information is in a one-to-one correspondence with a parameter of the cell identification information, and accessing, by the mobile terminal, a cell network corresponding to the locked identification information, when the obtained cell identification information includes the cell identification information matching the locked identification information, or skip accessing, by the mobile terminal, a wireless communication network when the obtained cell identification information does not include the cell identification information matching the locked identification information.

The present disclosure further provides a mobile terminal corresponding to the foregoing method embodiment.

The mobile terminal provided in this embodiment of the present disclosure may include a processor, a memory, a communications interface, and a bus.

The processor, the memory, and the communications interface are connected and communicate with each other using the bus.

The memory stores executable program code.

The processor reads the executable program code stored in the memory, to run a program corresponding to the executable program code to perform the following steps obtaining cell identification information of at least one cell network that covers a current location of the mobile terminal, where the cell network corresponds to a wireless communications network corresponding to a network standard supported by the mobile terminal, and the cell identification information is frequency channel number information, or the cell identification information includes frequency channel number information and auxiliary cell identification information, determining whether the cell identification information includes cell identification information matching locked identification information, where a parameter of the locked identification information is in a one-to-one correspondence with a parameter of the cell identification information, and accessing a cell network corresponding to the locked identification information, when the obtained cell identification information includes the cell identification information matching the locked identification information, or skip accessing a wireless communication network when the obtained cell identification information does not include the cell identification information matching the locked identification information.

The processor in the mobile terminal provided in this embodiment of the present disclosure may be a baseband chip. The memory may be a multi-chip package. The communications interface may include a USB port, a radio frequency component, and a WI-FI chip. In addition, the mobile terminal provided in this embodiment of the present disclosure may further include a subscriber identity module card.

Figure 7:
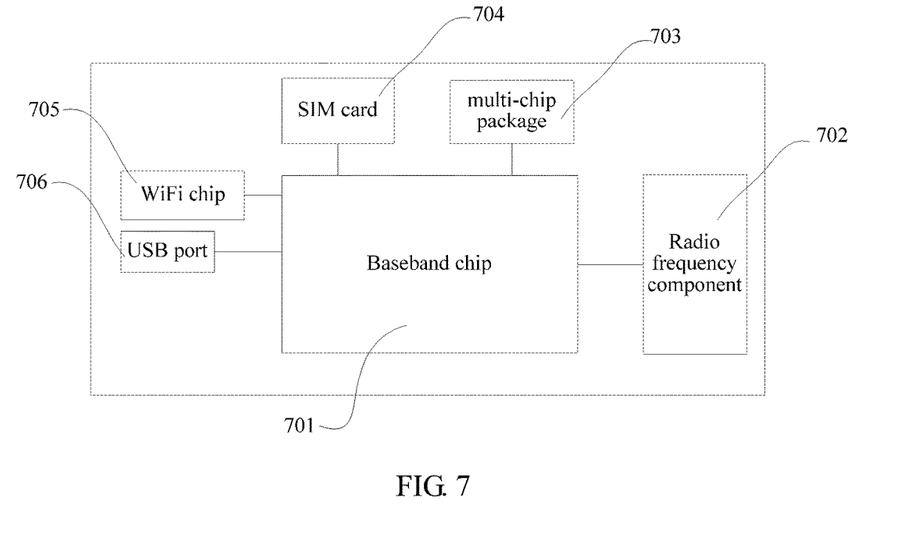
FIG. 7 is a schematic structural diagram of a mobile terminal according to an embodiment of the present disclosure.

Further, as shown in FIG. 7, the mobile terminal provided in this embodiment of the present disclosure may include a baseband chip 701, a radio frequency component 702, a multi-chip package 703, a subscriber identity module card (SIM card) 704, a WI-FI chip 705, and a USB port 706. The radio frequency component 702, the multi-chip package 703, the subscriber identity module card 704, the WI-FI chip 705, and the USB port 706 are all electrically connected to the baseband chip 701.

The baseband chip 701 is configured to perform operations such as performing data processing, completing signaling interaction with a network side, processing a control command and a data request of a control device, performing authentication using the SIM card 704, and reading/writing the multi-chip package 703.

The radio frequency component 702 is configured to provide a third generation (3G) uplink path of mobile WI-FI.

The multi-chip package 703 is integrated with a flash memory and a double date rate synchronous dynamic random access memory (DRAM). The flash memory is configured to store an image and data of the processor. The DRAM is configured to store a program that runs.

The WI-FI chip 705 is configured to carry a wireless local area network connection of the mobile terminal.

The USB port 706 is used as a physical connection path for the mobile terminal and the control device, and carries data interaction between the control device and the mobile terminal.

An embodiment of the present disclosure provides another mobile terminal. The mobile terminal may further include a power supply management unit. The power supply management unit supplies power to a baseband chip, a radio frequency component, a multi-chip package, a SIM card, a WI-FI chip, and a USB port.

The foregoing descriptions are merely examples of the embodiments of the present disclosure, but are not intended to limit the present disclosure. Any modification, equivalent replacement, or improvement made within the spirit and principle of the present disclosure should fall within the protection scope of the present disclosure.

What is claimed is:

1. A method for restricting a usage region of a mobile terminal, applied to a mobile terminal, comprising:
    obtaining cell identification information of at least one cell network that covers a current location of the mobile terminal, the at least one cell network corresponding to a wireless communications network corresponding to a network standard supported by the mobile terminal, and the cell identification information comprising at least one of frequency channel number information, and the frequency channel number information and auxiliary cell identification information;
    determining a cell network having maximum signal strength in the at least one cell network covering the current location of the mobile terminal;
    sending cell identification information corresponding to the cell network having maximum signal strength to a control device connected to the mobile terminal;
    determining, according to a region lock instruction delivered by the control device, the cell identification information corresponding to the cell network having maximum signal strength, the region lock instruction comprising the cell identification information corresponding to the cell network having maximum signal strength;
    determining the cell identification information corresponding to the cell network having maximum signal strength as locked identification information;
    determining whether the cell identification information comprises cell identification information matching the locked identification information, a parameter of the locked identification information being in a one-to-one correspondence with a parameter of the cell identification information;
    accessing, by the mobile terminal, a cell network corresponding to the locked identification information when the cell identification information comprises the cell identification information matching the locked identification information; and
    skipping access, by the mobile terminal, of a wireless communication network when the cell identification information does not comprise the cell identification information matching the locked identification information.

2. The method according to claim 1, wherein when the network standard supported by the mobile terminal is Global System for Mobile Communications (GSM), the cell identification information comprises the frequency channel number information and the locked identification information comprises a locked frequency channel number, and wherein when the network standard supported by the mobile terminal is not GSM, the cell identification information comprises the frequency channel number information and the auxiliary cell identification information, and the locked identification information comprises the locked frequency channel number and locked auxiliary identification information.

3. The method according to claim 1, wherein accessing the cell network corresponding to the locked identification information comprises accessing, by the mobile terminal, the cell network corresponding to the locked identification information when the cell identification information comprises the cell identification information matching the locked identification information, and when signal strength of the cell identification information matching the locked identification information is not less than a preset strength threshold.

4. The method according to claim 1, wherein obtaining the cell identification information of the at least one cell network covering the current location of the mobile terminal comprises:
    performing, by the mobile terminal, frequency scanning; and
    obtaining the cell identification information of the at least one cell network that covers the current location of the mobile terminal from a frequency scanning result.

5. The method according to claim 1, wherein obtaining the cell identification information of the at least one cell network covering the current location of the mobile terminal comprises:
    receiving, by the mobile terminal, a cell broadcast message; and
    obtaining, from the cell broadcast message, the cell identification information of the at least one cell network covering the current location of the mobile terminal.

6. A mobile terminal, comprising:
    a processor;
    a memory;
    a communications interface; and
    a bus,
    wherein the processor, the memory, and the communications interface are coupled and communicate with each other using the bus,
    wherein the memory is configured to store an executable program code, and
    wherein when executed, the executable program code causes the processor to be configured to:

obtain cell identification information of at least one cell network that covers a current location of the mobile terminal, the at least one cell network corresponding to a wireless communications network corresponding to a network standard supported by the mobile terminal, and the cell identification information comprising at least one of frequency channel number information and the frequency channel number information and auxiliary cell identification information;

determine a cell network having maximum signal strength in the at least one cell network covering the current location of the mobile terminal;

send the cell identification information corresponding to the cell network having maximum signal strength to a control device connected to the mobile terminal;

determine, according to a region lock instruction delivered by the control device, the cell identification information corresponding to the cell network having maximum signal strength, the region lock instruction comprising the cell identification information corresponding to the cell network having maximum signal strength;

determine the cell identification information corresponding to the cell network having maximum signal strength as locked identification information;

determine whether the cell identification information comprises cell identification information matching the locked identification information, a parameter of the locked identification information being in a one-to-one correspondence with a parameter of the cell identification information;

access a cell network corresponding to the locked identification information when the cell identification information comprises the cell identification information matching the locked identification information; and skipping access of a wireless communication network when the cell identification information does not comprise the cell identification information matching the locked identification information.

7. The mobile terminal according to claim 6, wherein when the network standard supported by the mobile terminal is Global System for Mobile Communications (GSM), the cell identification information comprises the frequency channel number information and the locked identification information comprises a locked frequency channel number, and wherein when the network standard supported by the mobile terminal is not the GSM, the cell identification information comprises the frequency channel number information and the auxiliary cell identification information, and the locked identification information comprises the locked frequency channel number and locked auxiliary identification information.

8. The mobile terminal according to claim 6, wherein the executable program code further causes the processor to be configured to access the cell network corresponding to the locked identification information when the cell identification information comprises the cell identification information matching the locked identification information, and signal strength of the cell identification information matching the locked identification information is not less than a preset strength threshold.

9. A non-transitory computer-readable storage medium comprising instructions which, when executed by a computer, cause the computer to carry out a method comprising:
obtaining cell identification information of at least one cell network that covers a current location of a mobile terminal, the at least one cell network corresponding to a wireless communications network corresponding to a network standard supported by the mobile terminal, and the cell identification information comprising frequency channel number information, or the frequency channel number information and auxiliary cell identification information;

determining a cell network having maximum signal strength in the at least one cell network covering the current location of the mobile terminal;

sending cell identification information corresponding to the cell network having maximum signal strength to a control device connected to the mobile terminal;

determining, according to a region lock instruction delivered by the control device, the cell identification information corresponding to the cell network having maximum signal strength, the region lock instruction comprising the cell identification information corresponding to the cell network having maximum signal strength;

determining the cell identification information corresponding to the cell network having maximum signal strength as locked identification information;

determining whether the cell identification information comprises cell identification information matching the locked identification information, a parameter of the locked identification information being in a one-to-one correspondence with a parameter of the cell identification information;

accessing, by the mobile terminal, a cell network corresponding to the locked identification information when the cell identification information comprises the cell identification information matching the locked identification information; and skip access, by the mobile terminal, of a wireless communication network when the cell identification information does not comprise the cell identification information matching the locked identification information.

10. The non-transitory computer-readable storage medium according to claim 9, wherein when the network standard supported by the mobile terminal is Global System for Mobile Communications (GSM), the cell identification information comprises the frequency channel number information and the locked identification information comprises a locked frequency channel number, and wherein when the network standard supported by the mobile terminal is not GSM, the cell identification information comprises the frequency channel number information and the auxiliary cell identification information, and the locked identification information comprises the locked frequency channel number and locked auxiliary identification information.

11. The non-transitory computer-readable storage medium according to claim 9, wherein accessing the cell network corresponding to the locked identification information comprises accessing, by the mobile terminal, the cell network corresponding to the locked identification information when the cell identification information comprises the cell identification information matching the locked identification information, and when signal strength of the cell identification information matching the locked identification information is not less than a preset strength threshold.

12. The non-transitory computer-readable storage medium according to claim 9, wherein obtaining the cell identification information of the at least one cell network covering the current location of the mobile terminal comprises:

performing, by the mobile terminal, frequency scanning; and obtaining the cell identification information of the at least one cell network that covers the current location of the mobile terminal from a frequency scanning result.

13. The non-transitory computer-readable storage medium according to claim 9, wherein obtaining the cell identification information of the at least one cell network covering the current location of the mobile terminal comprises:

receiving, by the mobile terminal, a cell broadcast message; and obtaining, from the cell broadcast message, the cell identification information of the at least one cell network covering the current location of the mobile terminal.

* * * * *